US007538677B2

(12) United States Patent
Hoshina et al.

(10) Patent No.: US 7,538,677 B2
(45) Date of Patent: May 26, 2009

(54) CONTACTLESS DATA COMMUNICATION SYSTEM, CONTACTLESS IDENTIFICATION TAG AND CONTACTLESS IDENTIFICATION TAG CONTROL PROGRAM

(75) Inventors: Masaki Hoshina, Suwa (JP); Hirofumi Kurosawa, Tatsuno (JP)

(73) Assignee: Seiko Epson Corporation (JP)

( * ) Notice: Subject to any disclaimer, the term of this patent is extended or adjusted under 35 U.S.C. 154(b) by 123 days.

(21) Appl. No.: 11/535,189

(22) Filed: Sep. 26, 2006

(65) Prior Publication Data

US 2007/0018827 A1 Jan. 25, 2007

Related U.S. Application Data

(63) Continuation of application No. 10/800,132, filed on Mar. 12, 2004, now Pat. No. 7,135,975.

(30) Foreign Application Priority Data

Mar. 14, 2003 (JP) ............................. 2003-070532

(51) Int. Cl.

| | |
|---|---|
| ***H04Q 5/22*** | (2006.01) |
| ***G08B 13/14*** | (2006.01) |
| ***G08B 21/00*** | (2006.01) |
| ***G06F 17/00*** | (2006.01) |
| ***G06F 19/00*** | (2006.01) |
| ***G06K 19/06*** | (2006.01) |

(52) U.S. Cl. .............. 340/572.1; 340/568.1; 340/568.2; 340/568.3; 340/568.4; 340/568.5; 340/572.3; 340/572.8; 340/686.1; 340/686.4; 340/687; 340/10.1; 340/10.42; 340/10.52; 235/375; 235/385; 235/492

(58) Field of Classification Search .............. 340/568.1, 340/568.2, 568.3, 568.4, 568.5, 572.1, 572.3, 340/572.8, 686.1, 686.4, 687, 10.1, 10.42, 340/10.52; 235/375, 385, 492

See application file for complete search history.

(56) References Cited

U.S. PATENT DOCUMENTS 5,151,684 A * 9/1992 Johnsen .................. 340/568.1

(Continued)

FOREIGN PATENT DOCUMENTS

JP 07-020650 1/1995

(Continued)

OTHER PUBLICATIONS

Patent Abstracts of Japan regarding Publication No. 2002-150248 published May 24, 2002.

(Continued)

*Primary Examiner*—Benjamin C Lee
*Assistant Examiner*—Lam P Pham
(74) *Attorney, Agent, or Firm*—Harness, Dickey & Pierce, P.L.C.

(57) ABSTRACT

A contactless data communication system includes a reader-writer device, a contactless identification tag including a plurality of contactless identification tags, and baggage including multiple pieces of baggage. The reader-writer device includes a data reception part, a data transmission part, a control part, an operation part, and a display part. The contactless identification tag includes a data communication part, a data control part, a voltage monitoring part, a detachment detection part, a display processing part, and an electrophoresis display device. The voltage monitoring part and the detachment detection part detect a voltage change caused when the contactless identification tag is detached from the baggage, so as to detect that the contactless identification tag is detached.

6 Claims, 7 Drawing Sheets

U.S. PATENT DOCUMENTS

| | | | | |
|---|---|---|---|---|
| 5,714,934 | A * | 2/1998 | Sasagawa et al. | 340/568.3 |
| 5,767,772 | A * | 6/1998 | Lemaire et al. | 340/571 |
| 5,952,922 | A | 9/1999 | Shober | |
| 5,959,532 | A * | 9/1999 | Fujiuchi et al. | 340/572.3 |
| 6,002,343 | A * | 12/1999 | Auerbach et al. | 340/10.41 |
| 6,050,622 | A * | 4/2000 | Gustafson | 292/307 R |
| 6,078,258 | A * | 6/2000 | Auerbach et al. | 340/568.2 |
| 6,229,444 | B1 * | 5/2001 | Endo et al. | 340/572.6 |
| 6,304,181 | B1 * | 10/2001 | Matsudaira | 340/571 |
| 6,545,605 | B2 | 4/2003 | Van Horn et al. | |
| 7,015,814 | B2 * | 3/2006 | Ireland et al. | 340/572.1 |
| 2003/0075608 | A1 * | 4/2003 | Atherton | 235/492 |
| 2003/0173408 | A1 * | 9/2003 | Mosher et al. | 235/492 |
| 2004/0066296 | A1 * | 4/2004 | Atherton | 340/572.1 |

FOREIGN PATENT DOCUMENTS

| | | |
|---|---|---|
| JP | 07-049931 | 2/1995 |
| JP | 2000-251164 | 9/2000 |
| JP | 2001-344579 | 12/2001 |
| JP | 2002-099886 | 4/2002 |
| JP | 2002-150248 | 5/2002 |
| JP | 2002-150249 | 5/2002 |
| JP | 2002-230488 | 8/2002 |

OTHER PUBLICATIONS

Patent Abstracts of Japan regarding Publication No. 2002-150249 published May 24, 2002.

* cited by examiner

CONTACTLESS DATA COMMUNICATION SYSTEM, CONTACTLESS IDENTIFICATION TAG AND CONTACTLESS IDENTIFICATION TAG CONTROL PROGRAM

CROSS REFERENCE TO RELATED APPLICATIONS

This application is a continuation patent application of U.S. Ser. No. 10/800,132 filed Mar. 12, 2004, claiming priority to Japanese Patent Application No. 2003-070532 filed Mar. 14, 2003 both of which are hereby expressly incorporated by reference herein in its entirety.

BACKGROUND

1. Field of the Invention

The present invention relates to data communications using a contactless identification tag, and particularly to a contactless communication system that is preferably used to detect that the contactless identification tag attached to baggage (e.g., a package) and so on is improperly detached.

2. Description of the Related Art

In a conventional system, a tag including a shock sensor (refer to Japanese Unexamined Patent Application Publication No. 2002-150248) is attached to a piece of baggage so as to detect that a shock is added to the baggage, by detecting a voltage change caused when the shock sensor is disconnected by the shock beyond a certain amount (refer to Japanese Unexamined Patent Application Publication No. 2002-150249).

According to the invention as shown in Patent Document 2002-150249, although a shock can be usually detected, it is impossible to detect a shock when the tag is improperly detached because the shock sensor is not disconnected in such a case. Moreover, since the system provides no means to visually identify a tag to which the shock is added after detecting it, it requires complicated work to separate the tag to which the shock is added from other tags to which the shock is not added by detecting it again by means of the detection system.

According to the invention as shown in Patent Document 2002-150248, the disconnection is detected by using the shock sensor as a part of an antenna. In this case, since a deviation in resonant frequencies blocks communications, it is impossible to discern whether the problem is a breakdown or a shock.

In consideration of the above-mentioned problems posed by the conventional art, the present invention aims to provide a contactless communication system, a contactless identification tag and a contactless identification tag control program to detect that the contactless identification tag attached to a given object is improperly detached.

SUMMARY

In order to solve the problems described above, a contactless communication system according to the present invention includes a reader-writer device and a contactless identification tag. The reader-writer device includes a data communication means that is capable of data communications with the contactless identification tag and an electromagnetic wave transmission means for supplying power that transmits electromagnetic waves for supplying power to the contactless identification tag at the time of data communications by the data communication means. The contactless identification tag includes a driving electric power generation means that generates driving electric power from the electromagnetic waves for supplying power transmitted from the reader-writer device, an attachment means to attach the contactless identification tag to a given object, a detachment detection means to detect whether the contactless identification tag, which is attached to the given object by the attachment means, is detached from the given object or not, and a specific information display means to display specific information based on a detection result obtained by the detachment detection means.

According to this composition of a first mode of the invention, the reader-writer device does data communications with the contactless identification tag by the data communication means, transmits electromagnetic waves to the contactless identification tag by the electromagnetic wave transmission means for supplying power at the time of data communications by the data communication means. The contactless identification tag generates driving electric power from the electromagnetic waves for supplying power transmitted by the reader-writer device by the driving electric power generation means, attaches the contactless identification tag to a given object by the attachment means, detects whether the contactless identification tag, which is attached to the given object by the attachment means, is detached from the given object or not, and displays the specific information by the specific information display means, based on a detection result obtained by the detachment detection means.

Accordingly, it becomes possible to easily visually find out (or discern) if the contactless identification tag is detached by detecting that the contactless identification tag attached to the given object, such as baggage, is detached and displaying that fact. While the term “baggage” is used throughout this application, one skilled in the art will appreciate that terms such as packages, parcels, and the like are to be considered equivalent thereto.

In this case, the contactless identification tag is such as used in the RFID (Radio Frequency Identification) system, and is generally called a data-carrier. The tag can be in various shapes, such as a label, a card, a coin, and a stick. These shapes are closely related to their applications. For example, the tag can be a keychain-like card or label as a carry-along device. The tag can mainly be stick-shaped as a semiconductor carrier ID. It may be coin-shaped for being sewn in linen goods.

The contactless identification tag also includes a memory region to exclusively read data or to read and write data freely. Furthermore, the tag of a certain type is workable without any battery by the contactless transmission of electric power from the antenna side.

Here, the RFID system is an ID system using electric and electromagnetic waves as a carrier. The system enables the contactless identification tag to (1) be portable in size, (2) store the information in an electronic circuit, and (3) perform contactless communications.

Therefore, the RFID system is used to integrate and share information with a person, object, automobile, etc. that has the contactless identification tag. In other words, necessary information is available to the person, object, or automobile, and new information is added as necessary.

Representative examples of the RFID system include the following: an electromagnetic coupling system, in which communications with the contactless identification tag are done by using mutual induction of coils in an alternating magnetic field; an electromagnetic induction system, in which communications with the contactless identification tag are done by mainly using electromagnetic waves at a frequency of 250 kHz or below or at a low- to medium-frequency of 13.56 MHz; a microwave system, in which data communications between the antenna at the side of the reader-writer device and the contactless identification tag are done by using electromagnetic waves at a frequency of 2.45 GHz; and an optical system, in which communications with the contactless identification tag are done by using optical transmission from an LED as a source of light to a photo transistor etc. as a light receiver.

Major access modes are the following: a single access mode, a FIFO (First In First Out) access mode, a multi access mode and a selective access mode.

In the single access mode, there is one contactless identification tag within an antenna communication region. On the other hand, if there is a plurality of contactless identification tags, which causes a communication error, it is impossible to communicate.

In the FIFO access mode, it is possible to communicate with one contactless identification tag after another coming into the antenna communication region. Since the contactless identification tag which has completed communications is kept in an access denied status, it is possible to communicate with a new tag coming into the antenna communication region, even if there are a plurality of contactless identification tags having completed communications remaining in the region. If a plurality of contactless identification tags come into the antenna communication region at the same time, which causes a communication error, it becomes impossible to communicate. The access denied status is removed once the contactless identification tag leaves the communication region.

In the multi access mode, it is possible to communicate with all contactless identification tags, even if there is a plurality of contactless identification tags in the antenna communication region.

In the selective access mode, it is possible to communicate with only specified contactless identification tags out of a plurality of contactless identification tags within the communication region. This is realized by using a command to allocate a number to each of the contactless identification tags within the communication region and a command to communicate with the specified contactless identification tags based on the allotted numbers.

A second mode of the invention is different from the first mode of the invention in that the contactless identification tag includes a detection result transmission means to transmit information indicating detachment of the tag to the reader-writer device when the detachment detection means detects that the contactless identification tag is detached from a given object.

That is, the contactless identification tag transmits information indicating the detachment to the reader-writer device, when the contactless identification tag is detected as being detached from the given object.

This enables the reader-writer device to detect that the contactless identification tag is detached from baggage and so on, and thereby facilitating measures to be taken.

A third mode of the invention is different from the first and the second modes of the invention in that the specific information display means displays information indicating the detachment of the tag as the specific information, when the detachment detection means detects that the contactless identification tag is detached from a given object.

In other words, the specific information display means displays information indicating the detachment of the tag (by displaying an X-mark or a red screen, for example) as the specific information, when the detachment detection means detects that the contactless identification tag is detached.

Accordingly, it is possible to easily visually judge the detachment of the contactless identification tag with the displayed information if the contactless identification tag attached to the given object, such as baggage and so on, is wrongly detached, thereby possibly being improperly attached to other baggage and so on.

A fourth mode of the invention is different from the first through the third modes of the invention in that the detachment detection means includes a voltage monitoring circuit which is able to monitor a voltage. Here, a part of a circuit wiring composed of the contactless identification tag is coupled to the voltage monitoring circuit, and the wiring is disconnected when the contactless identification tag is detached from a given object, and thereby enabling detection that the contactless identification tag is detached from the given object by detecting a voltage change caused by the disconnection of the wiring.

That is, the detachment detection means includes the voltage monitoring circuit to monitor the voltage, a part of the circuit wiring composed of the contactless identification tag is coupled to the voltage monitoring circuit, the wiring is disconnected when the contactless identification tag is detached from the given object. Therefore, it is possible to detect that the contactless identification tag is detached from the given object by detecting a voltage change caused by the disconnection of the wiring.

As a consequence, it is possible to easily detect that the contactless identification tag is detached from a voltage change.

A fifth mode of the invention is different from the first through the fourth modes of the invention in that the specific information display means includes a display device having memory ability. In other words, the specific information display means has a display device with memory ability. If the display device is of an electrophoresis type having memory ability, it is possible to retain information, if it is once displayed, without consuming any electric power. Therefore, it is possible to keep displaying the information indicating the detachment of the tag. Here, the display device of the electrophoresis type utilizes electrophoretic mobility. Electrophoretic mobility means a phenomenon of minute particles naturally charged during dispersion (electrophoretic particles), migrating by the Coulomb force when applying an electric field to a liquid medium in which the minute particles are dispersed (a dispersion liquid). The display device of the electrophoresis type has ability to retain images once displayed (referred to as "memory ability" here), so it is possible to retain the images if displayed once, by applying an electric field.

A sixth mode of the invention is the contactless identification tag in the contactless communication system according to the first mode of the invention. The contactless identification tag includes a driving electric power generation means that generates driving electric power from electromagnetic waves for supplying power transmitted from the reader-writer device, an attachment means to attach the contactless identification tag to a given object, a detachment detection means to detect whether the contactless identification tag attached to the given object by the attachment means is detached from the given object or not and a specific information display means to display the specific information based on the detection result obtained by the detachment detection means.

The present mode provides the contactless identification tag in the contactless communication system according to the first mode of the invention. Its functional operations being already described, the description is omitted here.

A seventh mode of the invention is different from the sixth mode of the invention in that the contactless identification tag includes a detection result transmission means that transmits information indicating the detachment of the tag to the reader-writer device when the detachment detection means detects that the contactless identification tag is detached from a given object.

The present mode provides the contactless identification tag in the contactless communication system according to the second mode of the invention. Its functional operations being already described, the description is omitted here.

An eighth mode of the invention is different from the sixth and the seventh modes of the invention in that the specific information display means displays information indicating wrongdoing as the specific information, when the detachment detection means detects that the contactless identification tag is detached from the given object.

The present mode provides the contactless identification tag in the contactless communication system according to the third mode of the invention. Its functional operations being already described, the description is omitted here.

A ninth mode of the invention is different from the sixth through eighth modes of the invention in that the detachment detection means includes a voltage monitoring circuit to monitor the voltage, a part of a circuit wiring composed of the contactless identification tag is coupled to the voltage monitoring circuit, the wiring is disconnected when the contactless identification tag is detached from the given object, and thereby enabling detection that the contactless identification tag is detached from a given object by detecting a voltage change caused by the disconnection of the wiring.

The present mode provides the contactless identification tag in the contactless communication system according to the fourth mode of the invention. Its functional operations being already described, the description is omitted here.

A tenth mode of the invention is different from the sixth through the ninth modes of the invention in that the specific information display means includes a display device having memory ability.

The present mode provides the contactless identification tag in the contactless communication system according to the fifth mode of the invention. Its functional operations being already described, the description is omitted here.

An eleventh mode of the invention is a program that controls the contactless identification tag according to the sixth mode of the invention. The program includes a detachment detection step that detects whether the contactless identification tag attached to a given object by the attachment means is detached from the given object or not, and a specific information display step that displays specific information based on a detection result obtained as a result of the detachment detection step.

The present mode provides a program to control the contactless identification tag according to the sixth mode of the invention. Its functional operations being already described, its description is omitted here.

A twelfth mode of the invention is the program that controls the contactless identification tag and that is different from the eleventh mode of the invention in that the specific information display step includes a detection result transmission step that transmits information indicating the detachment of the tag to the reader-writer device when it is detected that the contactless identification tag is detached from a given object in the detachment detection step.

The present mode provides a program to control the contactless identification tag according to the seventh mode of the invention. Its functional operations being already described, the description is omitted here.

A thirteenth mode of the invention is the program that controls the contactless identification tag and that is different from the eleventh and twelfth modes of the invention in that the specific information display step displays information indicating wrongdoing as specific information when it is detected that the contactless identification tag is detached from a given object in the detachment detection step.

The present mode provides a program to control the contactless identification tag according to the eighth mode of the invention. Its functional operations being already described, the description is omitted here.

DETAILED DESCRIPTION

An embodiment of the present invention will now be described referring to the accompanying figures. FIGS. 1 through 8 show an embodiment in which a contactless data communication system according to the present invention is applied to the baggage management operation of a shipping company.

Figure 1:
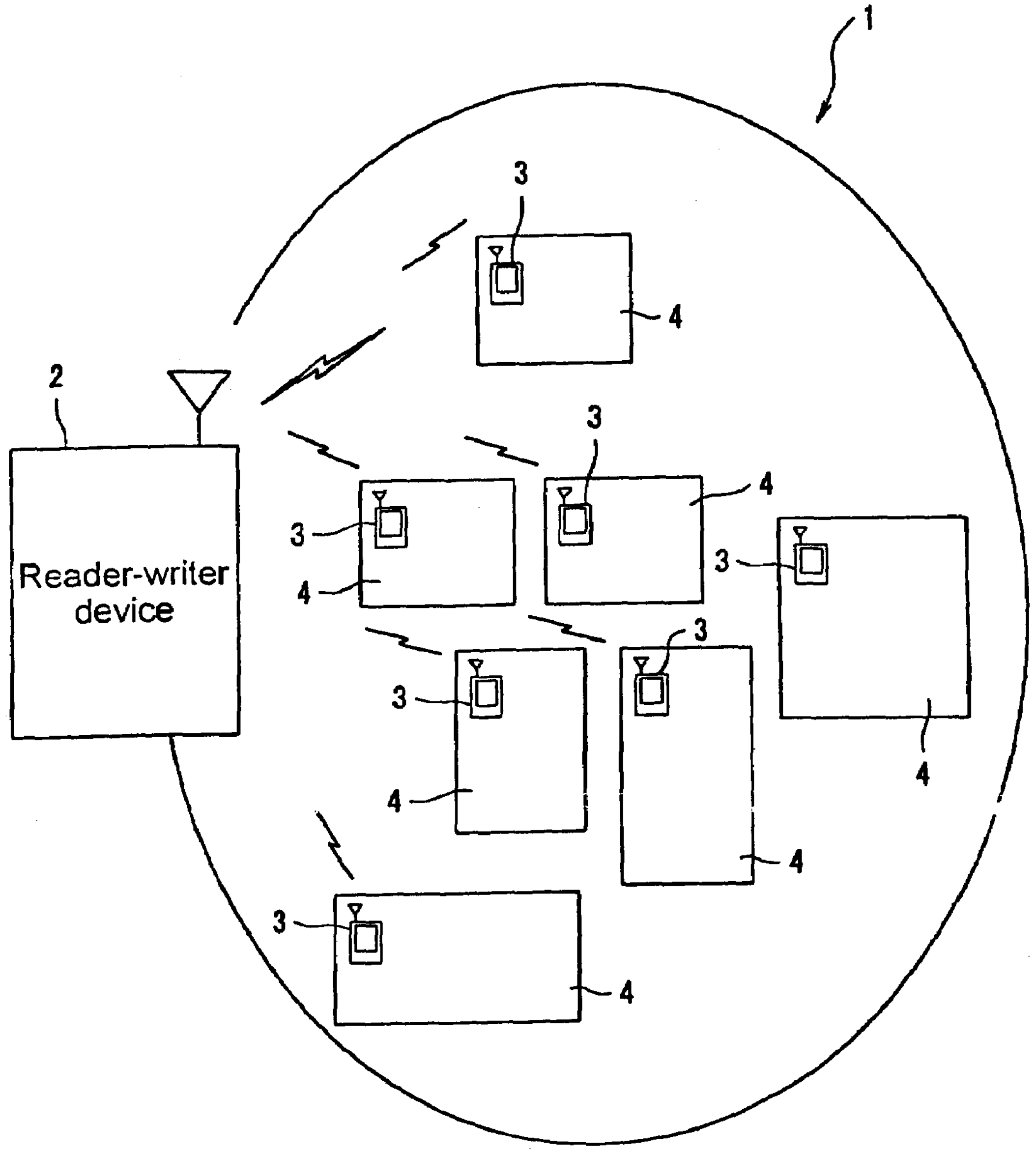
FIG. 1 is a block diagram showing the composition of a contactless communication system according to an embodiment of the present invention.

First, the composition of the contactless data communication system according to the present invention will be described referring to FIG. 1. FIG. 1 is a block figure showing the composition of the contactless data communication system according to the present invention.

As shown in FIG. 1, a contactless data communication system 1 includes a reader-writer device 2, a contactless identification tag 3 including a plurality of contactless identification tags, and baggage 4 including multiple pieces of baggage.

The reader-write device 2 writes management information such as a forwarding address and owner of the baggage and so on to the contactless identification tag 3 attached to the baggage 4, reads the management information written in the contactless identification tag 3 to display the fact in a display part, and also displays the information of a false use transmitted from the contactless identification tag 3 in the display part. The contactless identification tag 3 has an attachment part to attach itself to the baggage 4, corresponding to each piece of the baggage 4, and does contactless data communications with the reader-write device 2 by using an ID number so as to manage the baggage 4. In addition, the contactless identification tag 3 has a detection part to detect that it is detached from the baggage 4. The contactless identification tag 3 detects the fact and informs the reader-writer device 2 of the fact when itself is improperly detached from the baggage. The ID number is a particular one for each contactless identification tag 3 and is stored in a data memory part 33 of the contactless identification tag 3 described later.

The baggage 4 is baggage to be delivered according to an order of a customer in a shipping company. The contactless identification tag 3 is attached to each piece of baggage.

Figure 2:
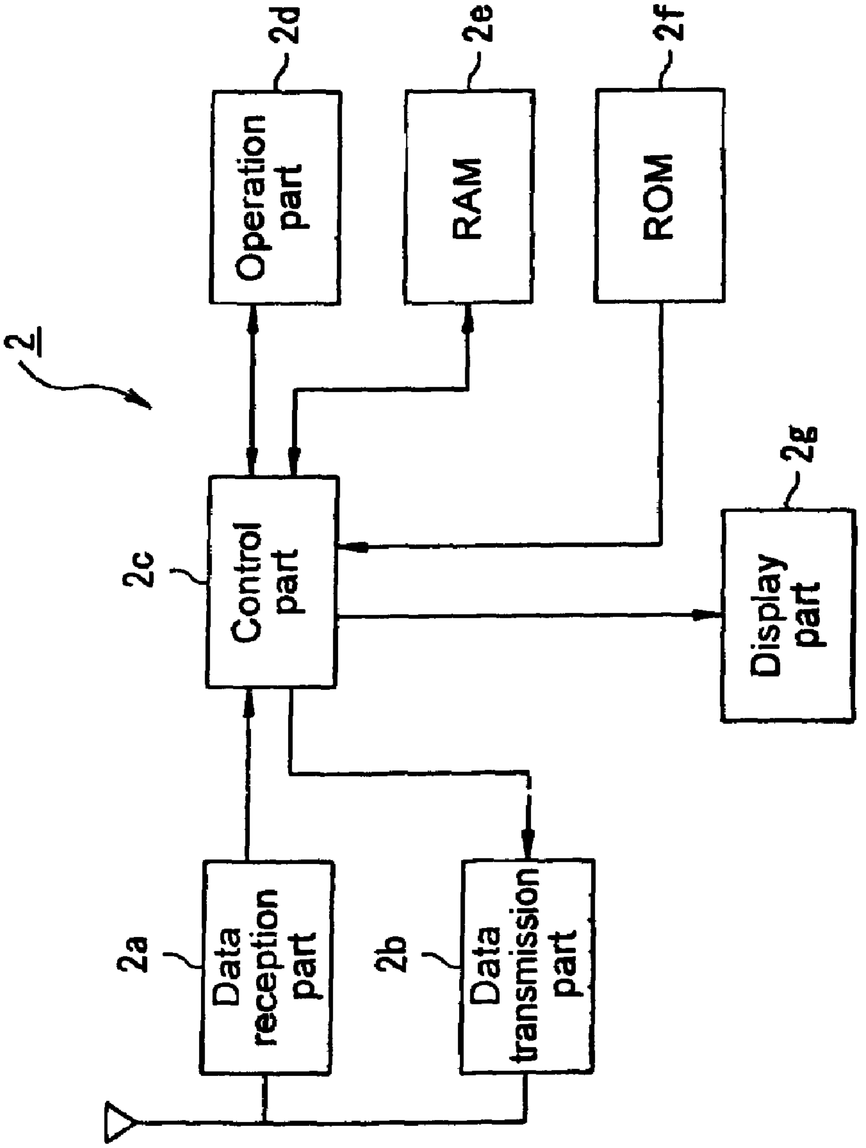
FIG. 2 is a block diagram showing the detailed composition of a reader-writer device 2.

The composition of the reader-write device 2 will be described referring to FIG. 2. FIG. 2 is a block figure showing the detailed composition of the reader-write device 2.

As shown in FIG. 2, the reader-write device 2 includes a data reception part 2*a*, a data transmission part 2*b*, a control part 2*c*, an operation part 2*d*, a RAM (Random Access Memory) 2*e*, a ROM (Read Only Memory) 2*f*, and a display part 2*g*.

The data reception part 2*a* receives information from the contactless identification tag 3 without any direct contact. Thereby, it becomes possible to get the management information related to the baggage 4 and the information indicating that the contactless identification tag is improperly detached, and so on.

The data transmission part 2*b* transmits a command to read information, such as the management information stored in the contactless identification tag 3 and the management information to correspond the contactless identification tag 3 to each piece of baggage and so on without any direct contact. According to the embodiment of the present invention, carrier waves at the time of the information transmission are used for supplying electric power to the contactless identification tag 3.

In this case, according to the embodiment of the present invention, communications between the reader-writer device 2 and the contactless identification tag 3 are done mainly by using the electromagnetic induction system in which electromagnetic waves at a frequency of 250 kHz band or below or at a low- to medium-frequency of 13.56 MHz are used to communicate, and also, the selective access mode is used to communicate with the specified contactless identification tag out of a plurality of the contactless identification tags in the communication region.

The control part 2 totally controls the operations of the reader-writer device 2 by implementing a control program stored in the ROM 2*f* by means of a CPU (Central Processing Unit) that is not shown in the figure. The operations to be controlled include data communication processing utilizing the electromagnetic induction system such as receiving data from the contactless identification tag 3 and transmitting data to the contactless identification tag 3 by using the data reception part 2*a* and the data transmission part 2*b*. Other examples are changing set values for implementing the control program according to operations of the operation part 2*d*, and displaying of specific information such as information obtained from the contactless identification tag 3 on the display part 2*g*.

The operation part 2*d* includes operations such as switching power supply and resetting the program. The operation part 2*d* also includes a set part to set information to be written in the contactless identification tag 3, and so on.

The RAM 2*e* is a memory to temporally store necessary data to implement the control program stored in the ROM 2*f* by means of the CPU of the control part 2*c*.

The ROM 2*f* is a read-only memory in which the control program to totally control the reader-writer device 2 is stored.

The display part 2*g* includes a display region of liquid crystal and so on. The display part 2*g* functions to display information obtained from the contactless identification tag 3, set contents of the reader-writer device 2 at the present time, the status of processing, and so on.

Figure 3:
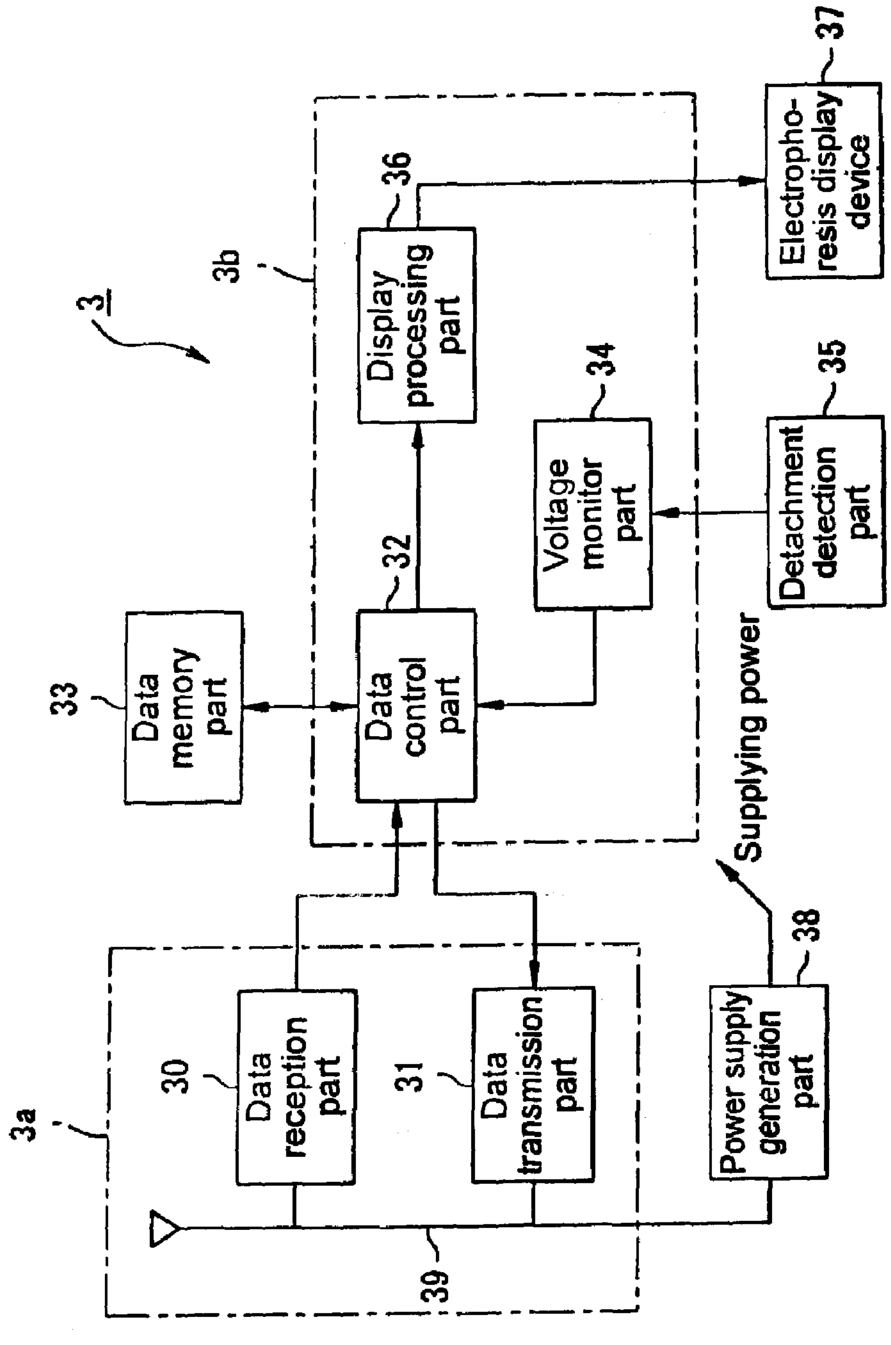
FIG. 3 is a block diagram showing the detailed composition of a contactless identification tag 3.

The composition of the contactless identification tag 3 will now be described referring to FIG. 3. FIG. 3 is a block diagram showing a detailed composition of the contactless identification tag 3.

As shown in FIG. 3, the contactless identification tag 3 includes a data communication part 3*a*, a control part 3*b*, a data memory part 33, a detachment detection part 35, an electrophoresis display part 37, a power supply generation part 38, and a coil antenna 39.

The data communication part 3*a* includes a data reception part 30, a data transmission part 31, and the coil antenna 39.

The data reception part 30 functions to receive data transmitted from the reader-writer device 2, utilizing the electromagnetic induction system.

The data transmission part 31 has a function to transmit specific data stored in the data memory part 33 to the reader-writer device 2 utilizing the electromagnetic induction system.

The coil antenna 39 receives electromagnetic waves including data transmitted from the reader-writer device 2 utilizing the electromagnetic induction system.

The control part 3*b* includes a data control part 32, a voltage monitoring part 34, and a display processing part 36, so as to control operations of each part of the contactless identification tag 3 by implementing the control program of each part by means of the CPU that is not shown in FIG. 3. According to the embodiment of the present invention, the operation of the contactless identification tag 3 is controlled by the CPU and the control program. In addition, the operations can be controlled by a logic circuit.

The data control part 32 controls data transmission and reception in the data communication part 3*a*, controls memory processing of received data, and so on.

The voltage monitoring part 34 monitors a voltage of a predetermined circuit in the contactless identification tag 3.

The display processing part 36 controls the display of specific information on the electrophoresis display part 37 according to a command from the data control part 32.

The data memory part 33 functions to store specific information, such as management information received from the reader-writer device 2 in its own memory. According to the embodiment of the present invention, the above-mentioned control program is also stored in the memory.

The detachment detection part 35 functions to detect that the contactless identification tag 3 once attached to the baggage 4 is detached, as a voltage change in the voltage monitoring part 34.

The electrophoresis display part 37 is a display device using the above-mentioned phenomenon of electrophoretic mobility.

The power supply generation part 38 generates power from electromagnetic waves transmitted from the reader-writer device 2 and supplies the power to each part described above.

Figure 4:
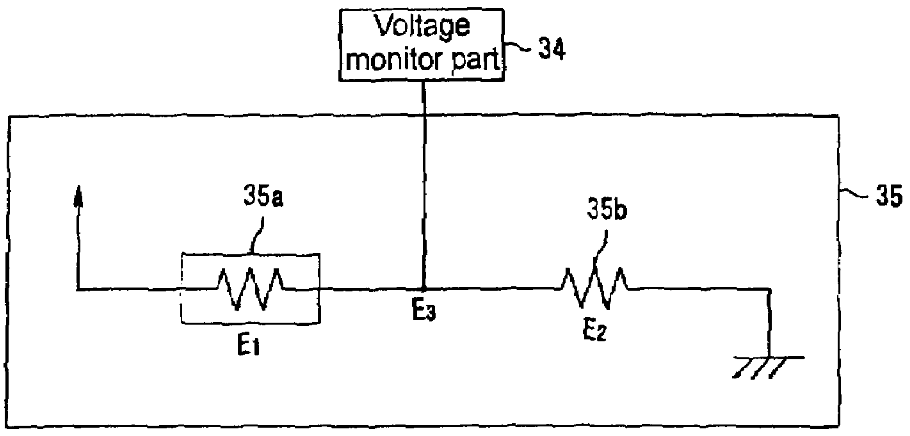
FIG. 4 is a figure showing the composition of detachment detection by a voltage monitoring part 34 and a detachment detection part 35.

The compositions of the voltage monitoring part 34 and the detachment detection part 35 will now be described referring to FIG. 4. FIG. 4 is a figure showing the composition of detachment detection by the voltage monitoring part 34 and the detachment detection part 35.

As shown in FIG. 4, the detachment detection part 35 includes a first detective resistor part 35*a* and a second detective resistor part 35*b*. One end of the wiring of the first detective resistor part 35*a* is coupled to the power supply and the other end is coupled to the second detective resistor part 35*b*. One end of the wiring of the second detective resistor part 35*b* is coupled to a ground part of a circuit and the other end is coupled to the first detective resistor part 35*a*. The wiring extending from the joint part of the first detective resistor part 35*a* and the second detective resistor part 35*b* is coupled to the voltage monitoring part 34.

That is, a voltage $E_3$ at the joint part divided by the first detective resistor part 35*a* and the second detective resistor part 35*b* is monitored by the voltage monitoring part 34.

Next, a detailed composition of the contactless identification tag 3 will be described referring to FIGS. 5 and 6.

Figure 5A:
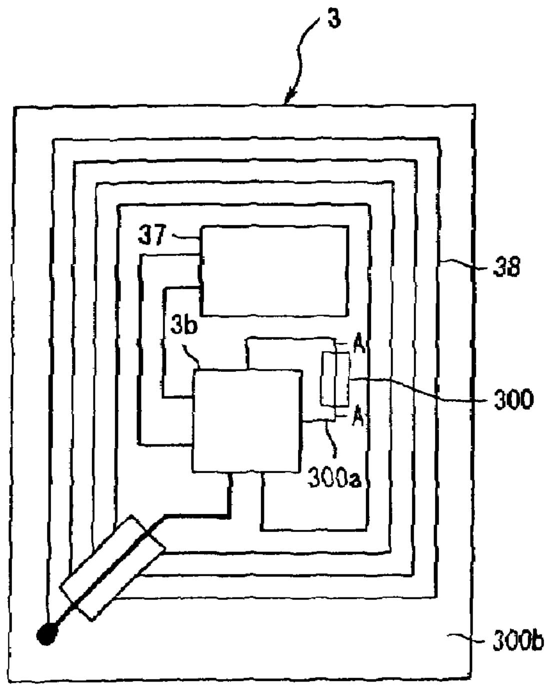
FIG. 5(*a*) is a figure showing the circuit composition of the contactless identification tag, while FIG. 5(*b*) is a sectional view along the line A-A in FIG. 5(*a*).
Figure 5B:
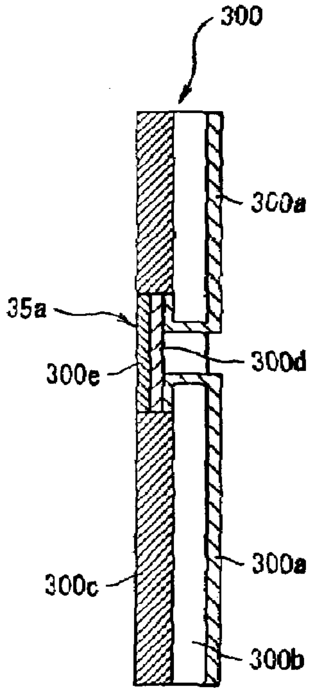

FIG. 5(*a*) is a figure showing the circuit composition of the contactless identification tag, FIG. 5(*b*) is a sectional view along the line A-A in FIG. 5(*a*). FIG. 6(*a*) is a sectional view along the line A-A when the contactless identification tag 3 shown in FIG. 5(*a*) is attached to the baggage 4. FIG. 6(*b*) is a figure showing the state in which the contactless identification tag 3 shown in FIG. 5(*a*) is detached from the baggage 4 in the sectional view of FIG. 6(*a*).

As shown in FIG. 5(*a*), the circuit composition of the contactless identification tag 3 includes a substrate 300*b* and a coil antenna 39. Formed on the substrate 300*b*, the coil antenna 39 is made of a whirl-like (concentric) metal wire with one stroke sketch (continuous) along the surrounding of the substrate 300*b*. According to the embodiment of the present invention, the coil antenna 39 is formed by the ink-jet method using a metal ink.

At the center of the substrate 300*b*, the control part 3*b* is mounted as an IC chip, and the electrophoresis display part 37 is also mounted. Coupled to the control part 3*b* with a wiring 300*a* as shown in FIG. 5(*b*), a detachment detection circuit part 300 is provided. In the detachment detection circuit part 300, a wiring 300*d* of the first detective resistor part 35*a* is formed so that it can be conductive to the wiring 300*a*, while being adjacent to the wiring 300*a*. An adhesion part 300*c* in the figure adheres the contactless identification tag 3 to the baggage 4.

Figure 6A:
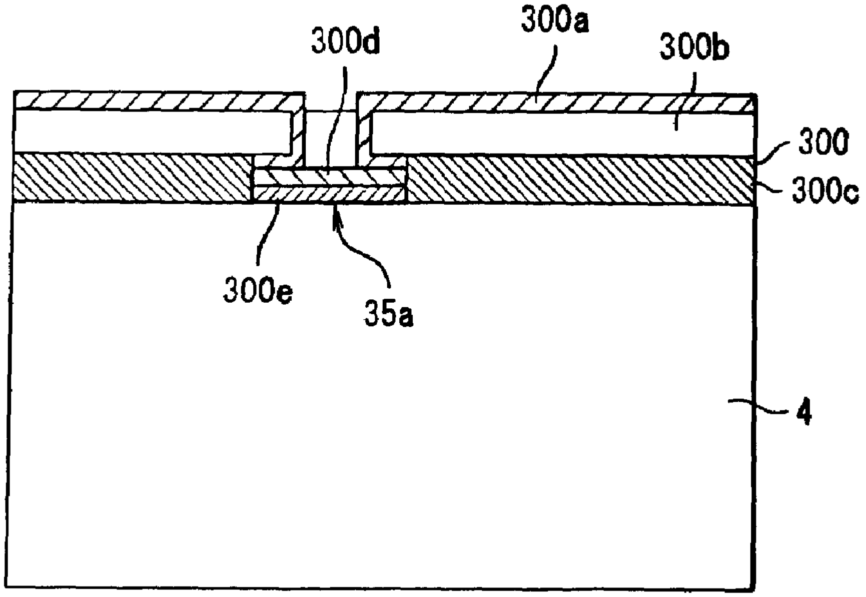
FIG. 6(*a*) is a sectional view along the line A-A when the contactless identification tag 3 shown in FIG. 5 is attached to a piece of baggage 4, while FIG. 6(*b*) is a figure showing the state in which the contactless identification tag 3 is detached from the baggage 4 in the sectional view FIG. 6(*a*).
Figure 6B:
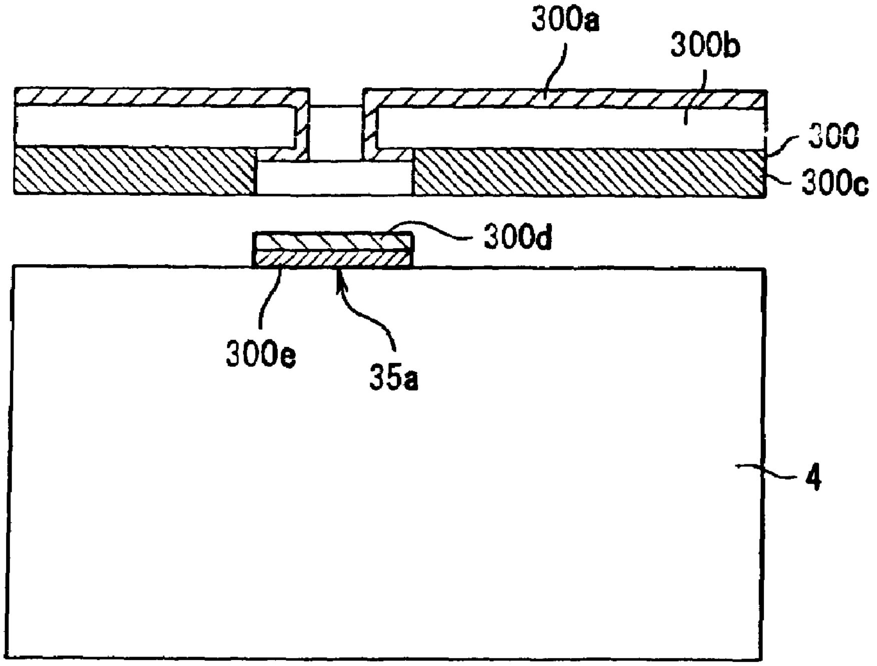

That is, as shown in FIG. 6(*a*), the contactless identification tag 3 is adhered to the baggage 4 by the adhesion part 300*c*. Here, the adhesion part 300*e* of the first detective resistor part 35*a* is formed in such a way as it can be separated from the other adhesion part 300*c*. As shown in FIG. 6(*b*), when the contactless identification tag 3 is detached from the baggage 4, the first detective resistor part 35*a*, accompanied by the wiring 300*d* and the adhesion part 300*e*, is left on the baggage 4, separated from the body of the contactless identification tag 3, because the wiring 300*d* is adhered to the wiring 300*a* with weaker adhesion strength with that to the adhesive part 300*c*.

Thus, the first detective resistor part 35*a* is separated from the circuit shown in FIG. 4 when the contactless identification tag 3 is detached from the baggage 4. Consequently, the voltage divided by the first detective resistor part 35*a* and the second detective resistor part 35*b* is not divided any more, so that the voltage $E_3$ changes. The voltage change is detected by the voltage monitoring part 34, which indicates that the contactless identification tag 3 is detached from the baggage 4.

The function of the contactless data communication system 1 will now be described in greater detail.

Here, according to the embodiment of the present invention, the contactless data communication system 1 is applied to the baggage management of a shipping company. The system aims to check whether a contactless identification tag is detached from a piece of baggage or not and whether a false tag is used or not.

The contactless identification tag 3 is attached to the baggage 4 in advance. Then information to be written in the contactless identification tag 3, which is attached to each piece of the baggage 4 to be shipped, is set by the operation part 2*d* of the reader-writer device 2. Here, examples of the information to be set include a baggage sender, a baggage type, a baggage destination, an expected shipping date, and so on. After finishing setting the information, the set information is transmitted to the contactless identification tag 3 having each targeted ID number via the data transmission part 2*b*.

On the contactless identification tag 3 side, when it receives a response request signal from the reader-writer 2, it generates driving electric power from carrier waves of the signal by the power supply generation part 38, and supplies the power to each part of the contactless identification tag 3. Then the information transmitted from the reader-writer device 2 is received via the data reception part 3*a* according to the control of the data control part 32, to which electric power is given through the above mentioned step, and is stored in a non-volatile memory by the data memory part 33. Furthermore, the information, such as a baggage type, a baggage destination, and an expected shipping date is respectively displayed in letters on the electrophoresis display device 37 by the information display processing part 36, based on the stored information. Finally, a response signal indicating that all of this series of operations have been completed is transmitted to the reader-writer device 2 via the data transmission part 31. Here, electric power is not necessary to retain the display of the information because of the features of the electrophoresis display device 37.

When the contactless identification tag 3 is detached from the baggage 4, the first detective resistor part 35*a* is separated from the body, as shown in FIG. 6(*b*). Then, in this state, if the contactless identification tag 3 receives the response request signal from the reader-writer device 2, it generates driving electric power from carrier waves of the signal in the power supply generation part 38 and supplies the power to each part of the contactless identification tag 3, in the same way as described above. Thereby, in the voltage monitoring part 34, to which electric power is supplied, a change of the voltage $E_3$ is detected, and it is informed to the data control part 32. When the data control part 32 receives the information, it judges that the contactless identification tag 3 is detached from the baggage 4, and transmits a command to the display processing part 36 to make the electrophoresis display device 37 display the information indicating the detachment.

In this case, the display is such that clearly shows the state of the contactless identification tag 3, for example, a display of a large X-mark on the display part or a display of the whole screen in red or other bright colors.

Next, the contactless identification tag 3 transmits the information indicating that the contactless identification tag 3 is detached from the baggage 4 and its own ID number to the reader-writer device 2 via the data transmission part 31, by means of the control part 3*b*. When the reader-writer device 2 receives the information, the control part 2*c* judges that the contactless identification tag 3 of the responding ID number is detached from the baggage 4, and the information is displayed on the display part 2*g*. Seeing the displayed information, an operator of the reader-writer device 2 would check whether the contactless identification tag 3 is detached from the baggage 4 or not, or whether the contactless identification tag 3 once detached is wrongly (or improperly) used again (e.g., reattached to another, wrong, baggage 4).

When the contactless identification tag 3 is normally attached to the baggage 4, the contactless identification tag 3 only transmits its own ID number on receiving the response request signal from the reader-writer device 2. Thereafter, data communications between the contactless identification tag 3 and the reader-writer device 2, such as a command transmitted from the reader-writer device 2 and a response from the contactless identification tag 3 responding to the request, continue.

Here, there are various kinds of command, such as the response request command as described above, and also a data writing command to write the management information into the contactless identification tag 3, and so on.

Figure 7:
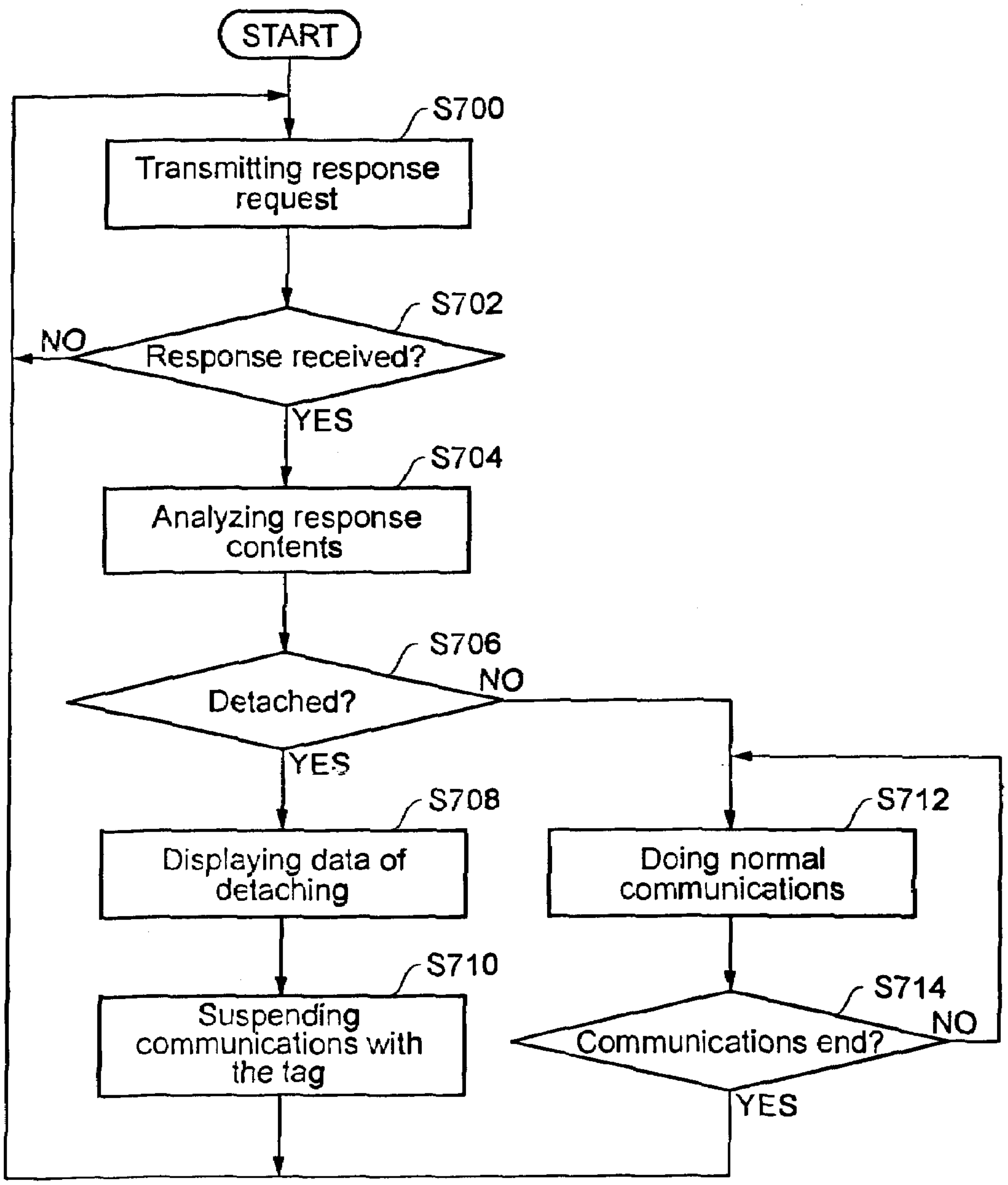
FIG. 7 is a flow chart showing the function operation of the data communication device 2.

The flow of operations of the reader-writer device 2 will be described referring to FIG. 7. FIG. 7 is a flow chart showing operations of the reader-writer device 2.

As shown in FIG. 7, the operations start with a step S700. The reader-writer device transmits a response request signal to the contactless identification tag 3 via the data transmission part 2*b* by means of the control part 2*c*, which carries the process forward to a step S702.

In the step S702, it is judged whether a response from the contactless identification tag 3 is received or not. In the case of "Yes", that is, it is judged that the response is transmitted within the specific time, and the process moves on to a step S704. If "No", the process moves back to the step S700.

In the step S704, the contents of response from the responding contactless identification tag 3 is analyzed by the control part 2*c*, which carries the process forward to a step S706.

In the step S706, it is judged whether the contactless identification tag 3 is detached from the baggage 4 or it is normally attached to the baggage 4, based on the analysis by the control part 2*c*. If "Yes", that is, it is judged that it is detached, the process moves on to a step S708. If "No", the process moves on to a S712.

In the step S708, information indicating that the responding contactless identification tag 3 is detached from the baggage 4 is displayed on the display part 2*g*, which carries the process forward to a step S710.

In the step 710, communications with the targeted contactless identification tag 3 are suspended by the control part 2*c*, which carries the process to the step S700.

On the other hand, in the step S712, normal communications with the responding contactless identification tag 3 are performed by to the control part 2*c*, which carries the process forward to a step S714.

In the step S714, it is judged whether communications with the contactless identification tag 3 have completed or not by the control part 2*c*. If "Yes", that is, it is judged that the communication has completed, the process moves back to the step S700. If "No", the process moves on to the step S712.

Figure 8:
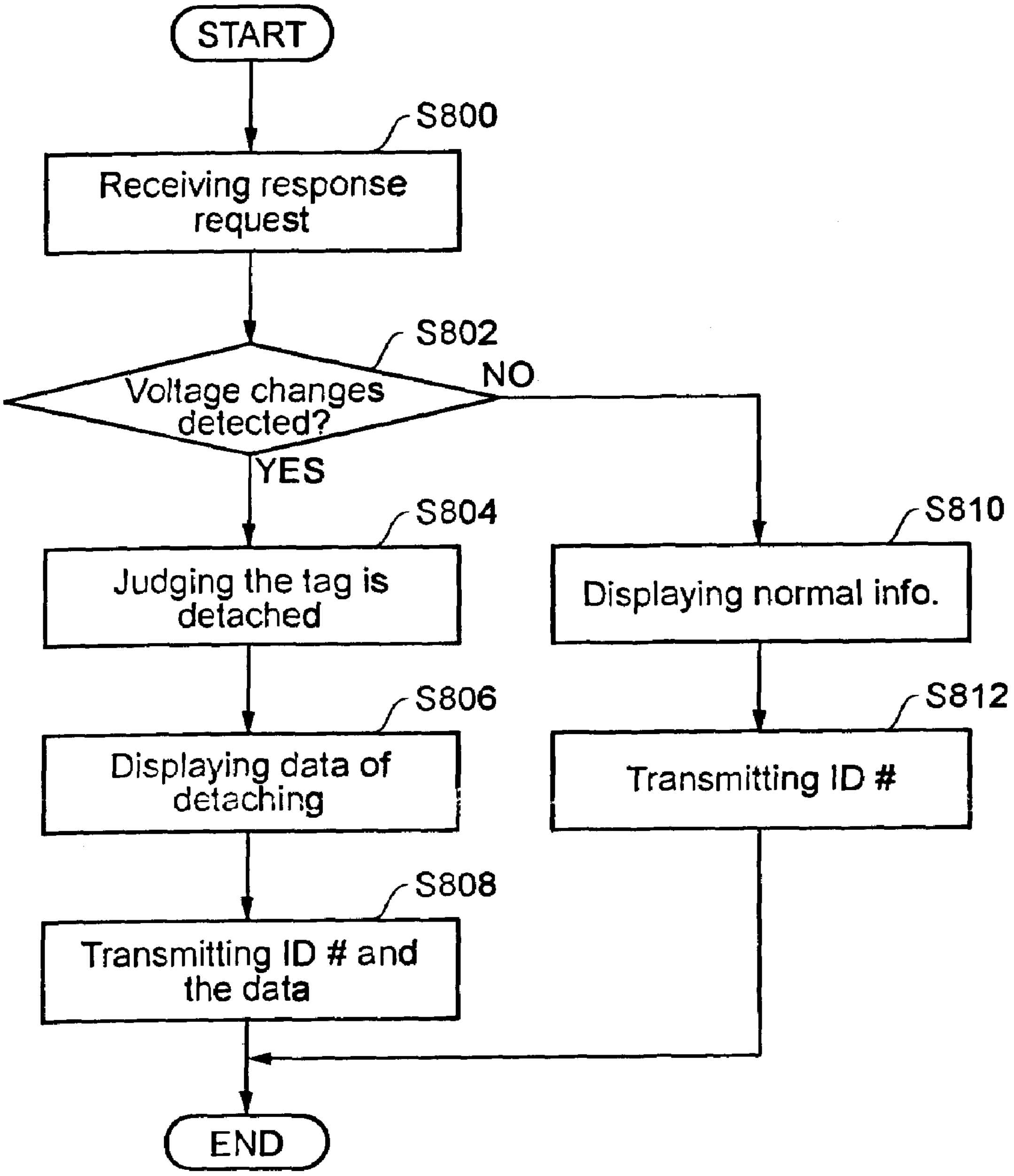
FIG. 8 is a flow chart showing response operations corresponding to a response request command from the contactless identification tag 3.

The flow of the response function of the contactless identification tag 3 to a response request command will now be described referring to FIG. 8. FIG. 8 is a flow chart showing the response function of the contactless identification tag 3 to a response request command.

As shown in FIG. 8, the operations start with a step S800. The contactless identification tag receives a response request command via the data reception part 30, which carries the process forward to a step 802.

In the step S802, it is judged whether a voltage change of the voltage $E_3$ is detected or not by the voltage monitoring part 34. If "Yes", that is, it is judged that it is detected, the process moves on to a step S804. If "No", the process moves on to a step S810.

In the step S804, it is judged that the contactless identification tag 3 is detached from the baggage 4, which carries the process forward to a step S806.

In the step S806, information indicating that the contactless identification tag 3 is detached from the baggage 4 is displayed on the electrophoresis display part 37 by the display processing part 36, which carries the process forward to a step S808.

In the step 808, an ID number and information indicating that the contactless identification tag 3 is detached from the baggage 4 are read out from the data memory part 33 via the data transmission part 31 by the data control part 32, and transmitted to the reader-writer device 2, which completes the operation.

On the other hand, in the step S802, when a change of the voltage $E_3$ is not detected by the voltage monitoring part 34, which carries the process to the step S810, normal information such as management information read out from the data memory part 33 is displayed by the display processing part 36 on the electrophoresis display part 37, which carries the process forward to a step S812.

In the step S812, the ID number, which is read out from the data memory part 33 via the data transmission part 31 by the data control part 32, is transmitted to the reader-writer device 2, which completes the operations.

As described above, since it is possible to detect that the contactless identification tag 3 is detached from the baggage 4 and display this fact on the electrophoresis display part 37 of the contactless identification tag 3, it is easy to visually find out if the contactless identification tag 3 is broken by an accident or the contactless identification tag 3 once detached is being improperly reused on another but wrong baggage 4.

Moreover, because the contactless identification tag 3 transmits information indicating the detachment to the reader-writer device 2 when it is detected that the contactless identification tag 3 attached to the baggage 4 is detached, and because also the reader-writer device 2 displays the information indicating the detachment of the contactless identification tag 3 on the display part 2*g*, an operator of the reader-writer device 2 can easily see that the contactless identification tag 3 is detached from the baggage 4.

The data communication operation with the contactless identification tag 3 by the data reception part 2*a* and the data transmission part 2*b* by means of the control part 2*c* shown in FIG. 2 corresponds to the data communication operation means described in the first mode of the invention. The supply operation of electromagnetic waves for supplying power by transmitting carrier waves by the data transmission part 2*b* by means of the control part 2*c* corresponds to the electromagnetic wave transmission means for supplying power described in the first mode of the invention. The detection operation to detect the detachment of the contactless identification tag 3 from the baggage 4 by the voltage monitoring part 34 and the detection part 35 shown in FIG. 3 corresponds to the detachment detection means described in the first through fourth modes of the invention and the sixth through ninth modes of the invention. The operation to display the information by the display processing part 36 and the electrophoresis display part 37 corresponds to the specific information display means described in any one of the first, third, fifth, sixth, eighth and tenth modes of the invention. The power supply generation part 38 corresponds to the driving electric power generation means described in the first and sixth modes of the invention. The adhesion parts 300*c* and 300*e* shown in FIGS. 5 and 6 correspond to the attachment means described in any one of the first, sixth, and eleventh modes of the invention.

According to the above-mentioned embodiment of the present invention, it is detected that the contactless identification tag 3 is detached from the baggage 4 by a voltage change by the voltage monitoring part 34 and the detachment detection part 35, as described above. In addition, it is possible to detect that the contactless identification tag 3 is detached from the baggage 4 by any other means, such as detecting a change in electric current values or using a switch to count the number of detachment of the contactless identification tag 3.

Moreover, according to the above-mentioned embodiment of the present invention, a voltage is changed by separating a substrate pattern including a resistor element from the body of the contactless identification tag 3 when the contactless identification tag 3 attached to the baggage 4 is detached. In addition, voltage values can be changed by some other means.

What is claimed is:

1. A contactless identification tag for attaching to an object, the contactless identification tag comprising:

a driving electric power generation part;

a first data reception part;

a first data transmission part;

a detachment detection part including a first detective resistor part and second detective resistor part that is electrically coupled to the first detective resistor part;

a control part including a voltage monitoring part that is electrically connected to a joint part through which the first detective resistor part is electrically coupled to the second detective resistor part; and an adhesion part including a first adhesion part and a second adhesion part, the second adhesion part being separable from the first adhesion part, the first detective resistor part being formed on the second adhesion part, and a wiring of the first detective resistor part being contacted to a wiring included in the detachment detection part with a combining force strength that is weaker than a strength of an adhesive force with which the first adhesion part is attached to the object.

2. The contactless identification tag according to claim 1;

the driving electric power generation part generating driving electric power from carrier waves of a reader-writer device and supplying the driving electric power to each part of the contactless identification tag, the control part controlling to an operation of each part of the contactless identification tag, and the contactless identification tag being attached to the object through the adhesion part.

3. The contactless identification tag according to claim 1 wherein;

the second adhesion part being separated from the first adhesion part when the contactless identification tag that has been attached to the object by the adhesion part is detached from the object;

the first detective resistor part and the second detective resistor part being electrically disconnected when the second adhesion part is separated from the first adhesion part, and the contactless identification tag judging whether the contactless identification tag is detached or not when the voltage monitoring part detecting a voltage change caused by the disconnection of the first detective resistor part and the second detective resistor part.

4. The contactless identification tag according to claim 1 further comprising:

a display, the display displaying an information that the contactless identification tag is detached from the object is displayed to the display when detecting that the contactless identification tag is detached from the object.

5. A contactless data communication system, comprising:

a reader-writer device; and a contactless identification tag that is claimed in claim 1, the reader-writer device including:

a second data reception part; and a second data transmission part that is able to communicate with the contactless identification tag without any direct contact, after the contactless identification tag that has been attached to the object is detached from the object and the contactless identification tag receives carrier waves from the second data transmission part, the detachment detection part and a voltage monitoring part of the contactless identification tag being able to detect that the contactless identification tag is detached from the object, and the contactless identification tag being able to transmit information that the contactless identification tag is detached from the object to the reader-writer device through the first data transmission part.

6. A contactless data communication system, comprising:

a reader-writer device; and a contactless identification tag that is claimed in claim 4, the reader-writer device including:

a second data reception part; and a second data transmission part that communicates with the contactless identification tag without any direct contact, after the contactless identification tag that has been attached to an object is detached from the object and the contactless identification tag receives carrier waves from the second data transmission part, the detachment detection part and the voltage monitoring part of the contactless identification tag being able to detect that the contactless identification tag is detached from the object, the contactless identification tag being able to transmit an information that the contactless identification tag is detached from the object to the reader-writer device through the first data transmission part, and the contactless identification tag being able to display the information to the display.

* * * * *